United States Patent
Baril et al.

(10) Patent No.: US 6,788,500 B2
(45) Date of Patent: Sep. 7, 2004

(54) SYSTEM AND METHOD FOR PRE-STRESSING A READ HEAD FOR IMPROVING PERFORMANCE THEREOF

(75) Inventors: Lydia Baril, Sunnyvale, CA (US); Ciaran A. Fox, Sunnyvale, CA (US); Jih-Shiuan Luo, San Jose, CA (US); Peter J. Melz, Hollister, CA (US); Chin-Yu Yeh, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 303 days.

(21) Appl. No.: 10/139,475

(22) Filed: May 6, 2002

(65) Prior Publication Data

US 2003/0206361 A1 Nov. 6, 2003

(51) Int. Cl.[7] .............................. G11B 5/127; G11B 5/33
(52) U.S. Cl. .................. 360/324.11; 360/66; 29/603.08
(58) Field of Search .............................. 360/66, 324.11; 29/603.08

(56) References Cited

U.S. PATENT DOCUMENTS

| | | | |
|---|---|---|---|
| 5,748,399 A | 5/1998 | Gill | 360/66 |
| 5,969,523 A | 10/1999 | Chung et al. | 324/252 |
| 6,118,622 A | 9/2000 | Gill | 360/113 |

*Primary Examiner*—David Hudspeth
*Assistant Examiner*—Rocio Colon
(74) *Attorney, Agent, or Firm*—Silicon Valley IP Group, PC; Dominic M. Kotab

(57) ABSTRACT

A system, method and computer program product provide an annealing process for setting a magnetization condition of a read head. An amount of heat for stabilizing magnetization condition of a read head is calculated. A width and amplitude of a voltage pulse that generates the calculated amount of heat in the read head are calculated. A voltage pulse of the calculated width and amplitude is applied to the read head for generating Joule heating in the read head. The width of the voltage pulse is less than one second.

19 Claims, 9 Drawing Sheets

$$\frac{\Delta R}{R} \approx 3\text{-}4\%$$

SYSTEM AND METHOD FOR PRE-STRESSING A READ HEAD FOR IMPROVING PERFORMANCE THEREOF

FIELD OF THE INVENTION

The present invention relates to magnetoresistive heads, and more particularly, this invention relates to applying a voltage pulse for normalizing a magnetic condition of a read head.

BACKGROUND OF THE INVENTION

Computer systems generally utilize auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive read sensors, commonly referred to as MR heads, are the prevailing read sensors because of their capability to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization of the MR element and the direction of sense current flowing through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers.

GMR sensors using only two layers of ferromagnetic material separated by a layer of non-magnetic electrically conductive material are generally referred to as spin valve (SV) sensors manifesting the GMR effect (SV effect). In a spin valve sensor, one of the ferromagnetic layers, referred to as the pinned layer, has its magnetization typically pinned by exchange coupling with an antiferromagnetic (e.g., NiO, FeMn, PtMn) layer. The magnetization of the other ferromagnetic layer, referred to as the free layer, however, is not fixed and is free to rotate in response to the field from the recorded magnetic medium (the signal field). In spin valve sensors, the spin valve effect varies as the cosine of the angle between the magnetization of the pinned layer and the magnetization of the free layer. Recorded data can be read from a magnetic medium because the external magnetic field from the recorded magnetic medium causes a change in the direction of magnetization in the free layer, which in turn causes a change in resistance of the spin valve sensor and a corresponding change in the sensed current or voltage. It should be noted that the AMR effect is also present in the spin valve sensor free layer.

FIG. 1 shows a typical spin valve sensor 100 (not drawn to scale) comprising end regions 104 and 106 separated by a central region 102. The central region 102 has defined edges and the end regions are contiguous with and abut the edges of the central region. A free layer (free ferromagnetic layer) 110 is separated from a pinned layer (pinned ferromagnetic layer) 120 by a non-magnetic, electrically-conducting spacer 115. The magnetization of the pinned layer 120 is fixed through exchange coupling with an antiferromagnetic (AFM) 125. An underlayer 126 is positioned below the AFM layer 125.

The underlayer 126, or seed layer, is any layer deposited to modify the crystallographic texture or grain size of the subsequent layers, and may not be needed depending on the substrate. A variety of oxide and/or metal materials have been employed to construct underlayer 126 for improving the properties of spin valve sensors. Often, the underlayer 126 may be formed of tantalum (Ta), zirconium (Zr), hafnium (Hf), or yttrium (Y). Ideally, such layer comprises NiFeCr in order to further improve operational characteristics. In particular, NiFeCr underlayer has been very successful in improving operational characteristics such as $\Delta R/R$.

Free layer 110, spacer 115, pinned layer 120, the AFM layer 125, and the underlayer 126 are all formed in the central region 102. Hard bias layers 130 and 135 formed in the end regions 104 and 106, respectively, provide longitudinal bias for the free layer 110. Leads 140 and 145 formed over hard bias layers 130 and 135, respectively, provide electrical connections for the flow of the sensing current $I_s$ from a current source 160 to the MR sensor 100. Sensor 170 is connected to leads 140 and 145 senses the change in the resistance due to changes induced in the free layer 110 by the external magnetic field (e.g., field generated by a data bit stored on a disk). IBM's U.S. Pat. No. 5,206,590 granted to Dieny et al. and incorporated herein by reference, discloses an MR sensor operating on the basis of the spin valve effect.

Another type of spin valve sensor is an anti-parallel (AP)-pinned spin valve sensor. FIG. 2A shows an exemplary AP-Pinned spin valve sensor 200 (not drawn to scale). Spin valve sensor 200 has end regions 202 and 204 separated from each other by a central region 206. AP-pinned spin valve sensor 200 comprises a Ni—Fe free layer 225 separated from a laminated AP-pinned layer 210 by a copper spacer layer 220. The magnetization of the laminated AP-pinned layer 210 is fixed by an AFM layer 208, or pinning layer, which is made of NiO. Again, beneath the AFM layer 208 is an underlayer 209. The laminated AP-pinned layer 210 includes a first ferromagnetic layer 212 (PF1) of cobalt and a second ferromagnetic layer 216 (PF2) of cobalt separated from each other by a ruthenium (Ru) anti-parallel coupling layer 214. The AMF layer 208, AP-pinned layer 210, copper spacer 220, free layer 225 and a cap layer 230 are all formed sequentially in the central region 206. Hard bias layers 235 and 240, formed in end regions 202 and 204, provide longitudinal biasing for the free layer 225. Electrical leads 245 and 250 are also formed in end regions 202 and 204, respectively, to provide electrical current from a current source (not shown) to the spin valve sensor 200.

Various parameters of a spin valve sensor may be used to evaluate the performance thereof. A couple of examples of such parameters are the structure sheet resistance (R) and GMR ratio ($\Delta R/R$) The GMR ratio ($\Delta R/R$) is defined as $(R_{AP}-R_P)/R_P$, where $R_{AP}$ is the anti-parallel resistance and $R_P$ is the parallel resistance.

Numerous theoretical studies have attempted to explain the behavior of spin valve effects. However, there does not currently exist an explanation of the main factors controlling the magnitude of the sensor response, as characterized by $\Delta R/R$, as it relates to the required properties of the conductive spacers and ferromagnetic (FM) layers constituting such device. Experimental efforts have been largely based on trial and error, by investigating various combinations of FM layers and conductive spacer layers. None of the previous work has yielded quantitative guidelines for the maximization of $\Delta R/R$ for spin valve sensors by providing selection criteria for the layer compositions of the FM material and the conductive spacer.

What is known is that the GMR effect depends on the angle between the magnetizations of the free and pinned layers. More specifically, the GMR effect is proportional to the cosine of the angle 13 between the magnetization vector of the pinned layer ($M_P$) and the magnetization vector of the free layer ($M_F$) (Note FIGS. 2B and 2C). In a spin valve sensor, the electron scattering and therefore the resistance is maximum when the magnetizations of the pinned and free layers are antiparallel, i.e., majority of the electrons are scattered as they try to cross the boundary between the MR layers. On the other hand, electron scattering and therefore the resistance is minimum when the magnetizations of the pinned and free layers are parallel; i.e., majority of electrons are not scattered as they try to cross the boundary between the MR layers.

In other words, there is a net change in resistance of a spin valve sensor between parallel and antiparallel magnetization orientations of the pinned and free layers. The GMR effect, i.e., the net change in resistance, exhibited by a typical prior art spin valve sensor is about 6% to 8%.

However, over time, the properties of a read head change. Because the read head is in essence a resistor, heat is generated as current passes through the head, leading to thermal degradation. The current also produces a magnetic field, which can magnetize the free layer of the head, also changing the properties of the head.

FIG. 3 is a chart 300 showing illustrative stress test data for a nominally identical group of heads with currents for the individual heads chosen so that that the maximum internal temperature of each head is 225 degrees C., with the external ambient temperature at 120 degrees C.

Over the first few hours of use, the properties of the head change quickly, such that the normalized amplitude of the current through the read head rapidly changes. This phenomenon is known as "short term amplitude spreading," and is indicated on FIG. 3 as occurring during time period 302. It would be desirable to accelerate the short term spreading so that head operation is more stable and more uniformly behaved from the first use.

The short-term amplitude spreading phenomenon also makes testing heads very expensive, as to perform an adequate test, current must be passed through the head for the short term spreading period. If the head is tested prior to short term decay, a bad head may test out as being good, or vice versa. Thus, the manufacturer must energize the heads for long periods of time prior to testing or run the risk of sending out a defective product. Thus it would be desirable to accelerate the short term decay so that the head may be tested in a state closer to how it will operate during actual use.

As shown in FIG. 3, the response of the amplitude in time (A/Ao is the amplitude divided by the initial amplitude) is different for each head. For short times, less than 10 hours, that average amplitude may increase or decrease in a fast rate, while for longer times there is a more-or-less uniform decay, at typically slower rate, of the amplitude short term amplitude decay.

Short term amplitude decay is at least partially due to a magnetic relaxation from the state in which the heads were manufactured to a stable state in use conditions. This relaxation is driven, in part, by the magnetic field from the current and is accelerated by temperature (from the combination of the Joule heating by the current and the ambient temperature). Essentially, the process of magnetic annealing is introduced when the heads are in use.

The effect of magnetic relaxation can be further realized from the polarity of the bias current. It is known that the direction of magnetic field from the bias current is current polarity sensitive. The effect is demonstrated in FIG. 6 (discussed in more detail below). In FIG. 6, the average short term behavior on a group of 10 to 15 heads is described using the average of normalized amplitude versus stress time. It is clearly seen that the normalized amplitude is either decrease or increase in a fast rate when the polarity is switched.

It would be desirable to remove or reduce amplitude spreading. The result would be a more uniform distribution of heads, which in turn would allow the reads to run at a higher bias voltage, producing more amplitude and reduced error rates.

After the quick short term decay, the current continues to decay during a "long term decay" period. Eventually, the current through the head stabilizes, but this can take a long time (several hundred hours).

What is needed is a way to push the head towards a stable condition before being used in a system. Also needed is a way to improve the deviation between sensors for how they behave in magnetic performance with time in files. What is also needed is a process that improves the magnetic performance of sensors by allowing more bias voltage to be applied through the sensors without trading off thermal stability.

DISCLOSURE OF THE INVENTION

The present invention overcomes the drawbacks and limitations described above by providing an electrically induced annealing process for setting a magnetization condition of a read head. A heat threshold of the read head is determined. An amount of heat for stabilizing a magnetization condition of the read head is determined, a stable magnetization condition being indicated in one way by a normalized amplitude of a current through the read head settling to within a semi-stable range. The determined amount of heat is preferably below the heat threshold to prevent irreversible thermal degradation of the head. A width (duration) and amplitude of a voltage pulse that generates the calculated amount of heat in the read head are verified experimentally. A voltage pulse of the calculated width and amplitude is applied to the read head for generating Joule heating in the read head. The width of the voltage pulse is less than one second. This process quickly stabilizes the read head, setting it to a desired magnetic state.

In one embodiment, the amplitude of the voltage pulse is calculated under a set pulse width for the sensor of the read head according to a Joule heating response of the sensor. Preferably, the Joule heating response of the sensor is a function of a resistance (electrical resistance contributes in part to the thermal impedance) of the sensor.

In another embodiment, the amount of heat is determined for the sensor in each read head, where multiple read heads are provided. Preferably, the amount of heat for the sensor is a function of a magnetoresistive width of the sensor of each read head.

In a further embodiment, a bias voltage is applied to the read head when the voltage pulse is applied.

In yet another embodiment, magnetic parameters of the read head, such as amplitude, asymmetry, etc., are measured before and after sending the voltage pulse to the read head. The read head is failed if a difference between the magnetic parameters measured before and after the voltage pulse is sent is above a prespecified value (including outside a prespecified range). This permits the discarding of parts which reveal a significant change in magnetization.

In still yet another embodiment, at least one additional pulse is applied to the read head. Magnetic parameters of the read head, such as amplitude, asymmetry, etc., are measured before and after sending each additional voltage pulse to the read head. No more pulses are sent if a difference between the magnetic parameters measured before and after the voltage pulse is below a prespecified value (including outside a prespecified range). Preferably, each pulse has the same polarity to assure the setting is adequate to the sensor.

In an even further embodiment, the ambient temperature around (in the area near) the read head is adjusted to a target temperature prior to sending the voltage pulse. This can be done by heating or cooling the air around the read head and/or anything encasing the read head.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

Prior Art

Prior Art

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 4:
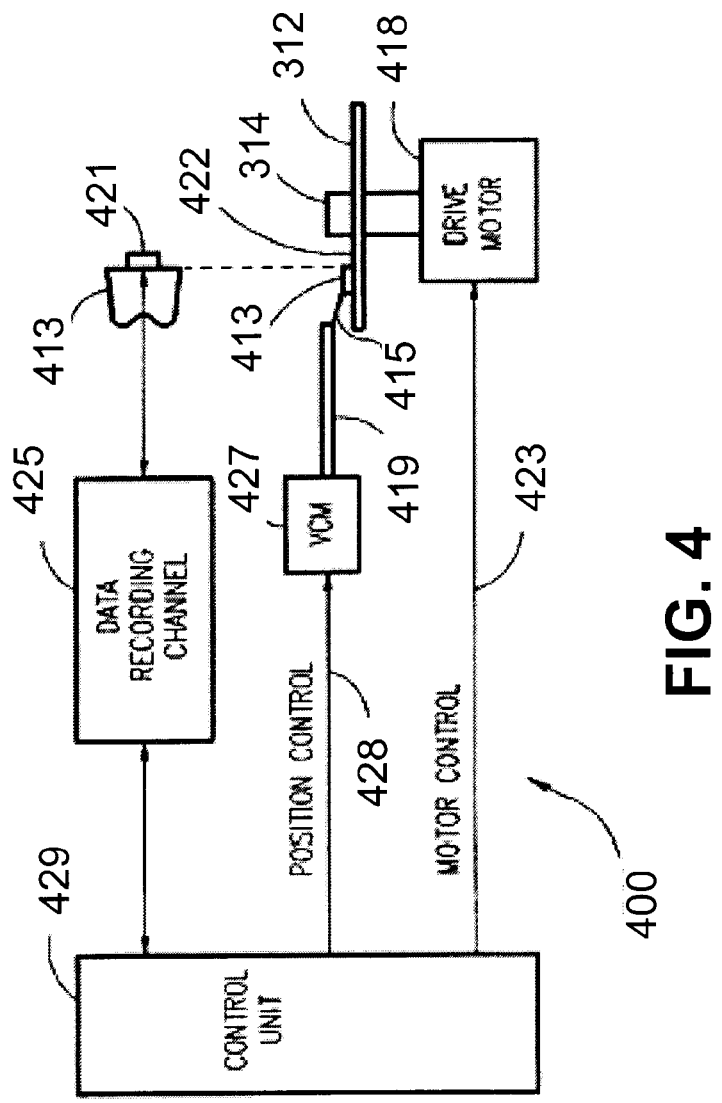
FIG. 4 is a perspective drawing of a magnetic recording disk drive system in accordance with one embodiment.

Referring now to FIG. 4, there is shown a disk drive 400 embodying the present invention. As shown in FIG. 4, at least one rotatable magnetic disk 412 is supported on a spindle 414 and rotated by a disk drive motor 418. The magnetic recording media on each disk is in the form of an annular pattern of concentric data tracks (not shown) on disk 412.

At least one slider 413 is positioned on the disk 412, each slider 413 supporting one or more magnetic read/write heads 421. As the disks rotate, slider 413 is moved radially in and out over disk surface 422 so that heads 421 may access different circuits of the disk where desired data are recorded. Each slider 413 is attached to an actuator arm 419 by means way of a suspension 415. The suspension 415 provides a slight spring force which biases slider 413 against the disk surface 422. Each actuator arm 419 is attached to an actuator means 427. The actuator means 427 as shown in FIG. 4 may be a voice coil motor (VCM). The VCM comprises a coil movable within a fixed magnetic field, the direction and speed of the coil movements being controlled by the motor current signals supplied by controller 429.

During operation of the disk storage system, the rotation of disk 412 generates an air bearing between slider 413 and disk surface 422 which exerts an upward force or lift on the slider. The air bearing thus counter-balances the slight spring force of suspension 415 and supports slider 413 off and slightly above the disk surface by a small, substantially constant spacing during normal operation.

The various components of the disk storage system are controlled in operation by control signals generated by control unit 429, such as access control signals and internal clock signals. Typically, control unit 429 comprises logic control circuits, storage means and a microprocessor. The control unit 429 generates control signals to control various system operations such as drive motor control signals on line 423 and head position and seek control signals on line 428. The control signals on line 428 provide the desired current profiles to optimally move and position slider 413 to the desired data track on disk 412. Read and write signals are communicated to and from read/write heads 421 by way of recording channel 425.

The above description of a typical magnetic disk storage system, and the accompanying illustration of FIG. 4 are for representation purposes only. It should be apparent that disk storage systems may contain a large number of disks and actuators, and each actuator may support a number of sliders.

Figure 5:
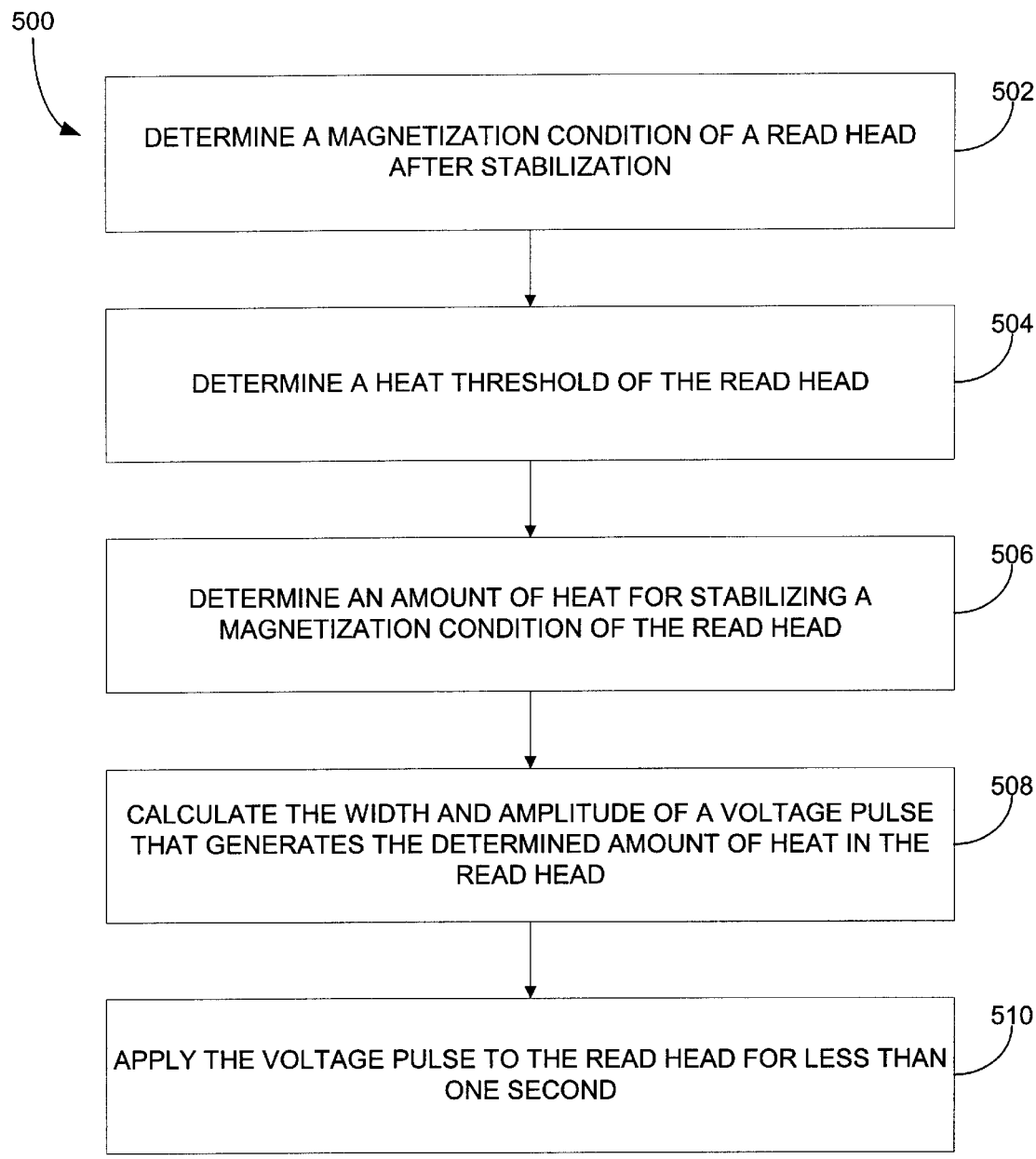
FIG. 5 depicts a fast annealing process for setting a magnetization condition of a read head according to one embodiment.

FIG. 5 depicts a fast annealing process 500 for setting a magnetization condition of a read head. As described above, the properties of the read head change over time. The process of FIG. 5 stabilizes the read head in about one second as opposed to several hours, by applying a voltage pulse. There are two effects when a voltage pulse is applied to the sensor: (1) Joule Heating, and (2) Magnetic Field from the bias voltage (current). As a result of the two effects, the voltage pulse introduces the net effect of magnetic annealing (heating+field) to the sensor and sets the sensor to a magnetic "end" state in which magnetization conditions of the head change very little thereafter. In this way, the effects of short-term amplitude spreading and amplitude decay (or increase) are accelerated to a matter of milliseconds, and thereby providing more stabilized performance.

Though the temperature applied to the head is greater than the temperature at normal operating conditions, the methodology presented herein is superior in that the effects of thermal degradation are minimized by the short heating time.

In operation 502, the magnetization condition of a read head after stabilization is determined such as by testing the head over time at a given temperature and at a given bias voltage. Note that the magnetization condition can be determined for different voltages and/or temperatures.

It is important to note that the required voltage and temperature can be adjusted by the ambient temperature. It is the net temperature inside the read sensor and the magnetic field from the bias to the read sensor that is important to set the magnetization of the read sensor to the desired state. Essentially, a temperature stage for controlling the ambient temperature can be added if necessary. For example, suppose the optimized conditions is to pulse the read head at 170 mV for setting the magnetization and at the temperature of 250C in the sensor. However, 170 mV is too low to raise the sensor temperature to 250C if the ambient temperature is at 30C. A temperature stage can be added to heat or cool the sensor for compensating the sensor temperature to the desired setup state.

Figure 1:
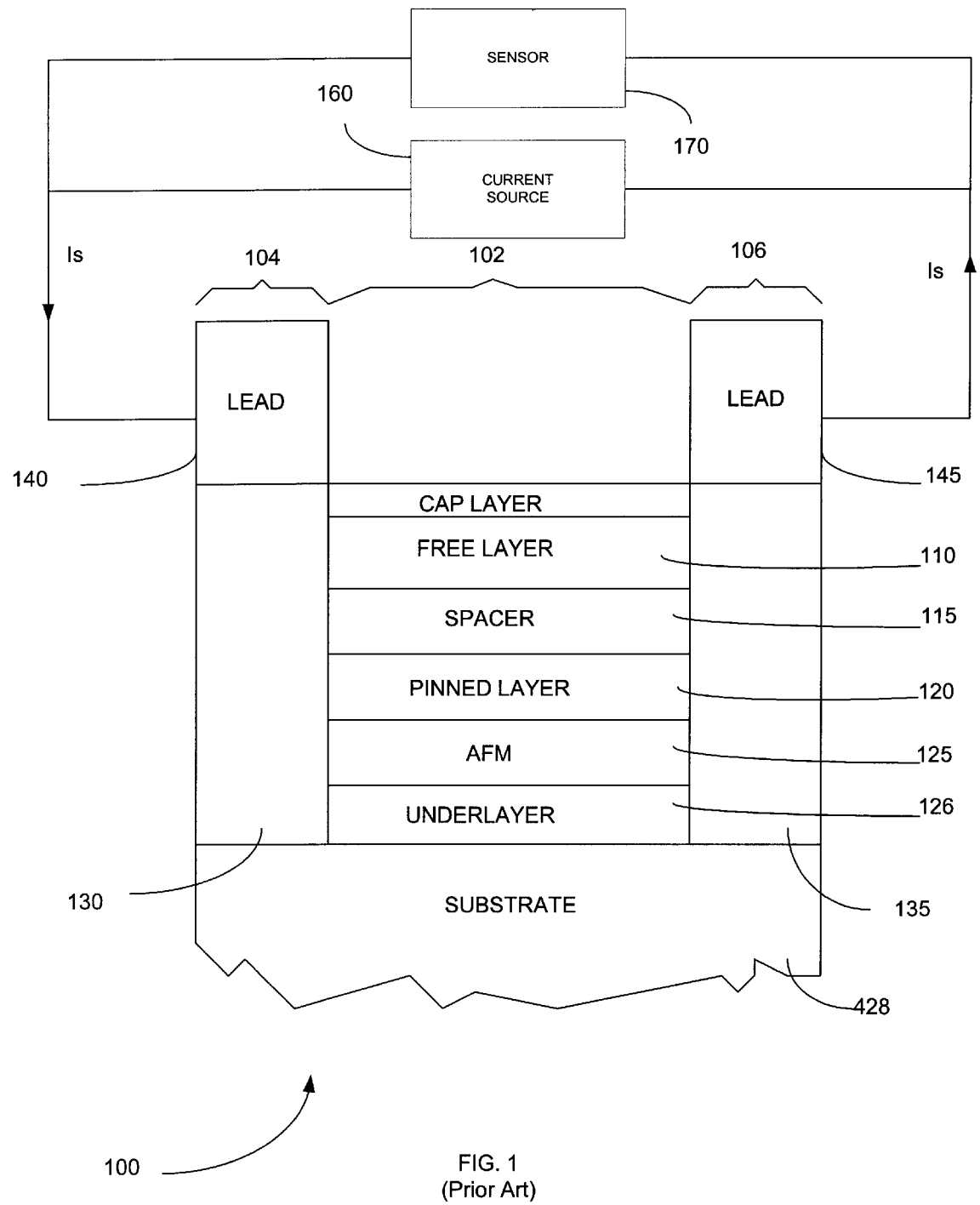
FIG. 1 illustrates a cross-sectional view of a MR head, in accordance with the prior art.
Figure 2A:
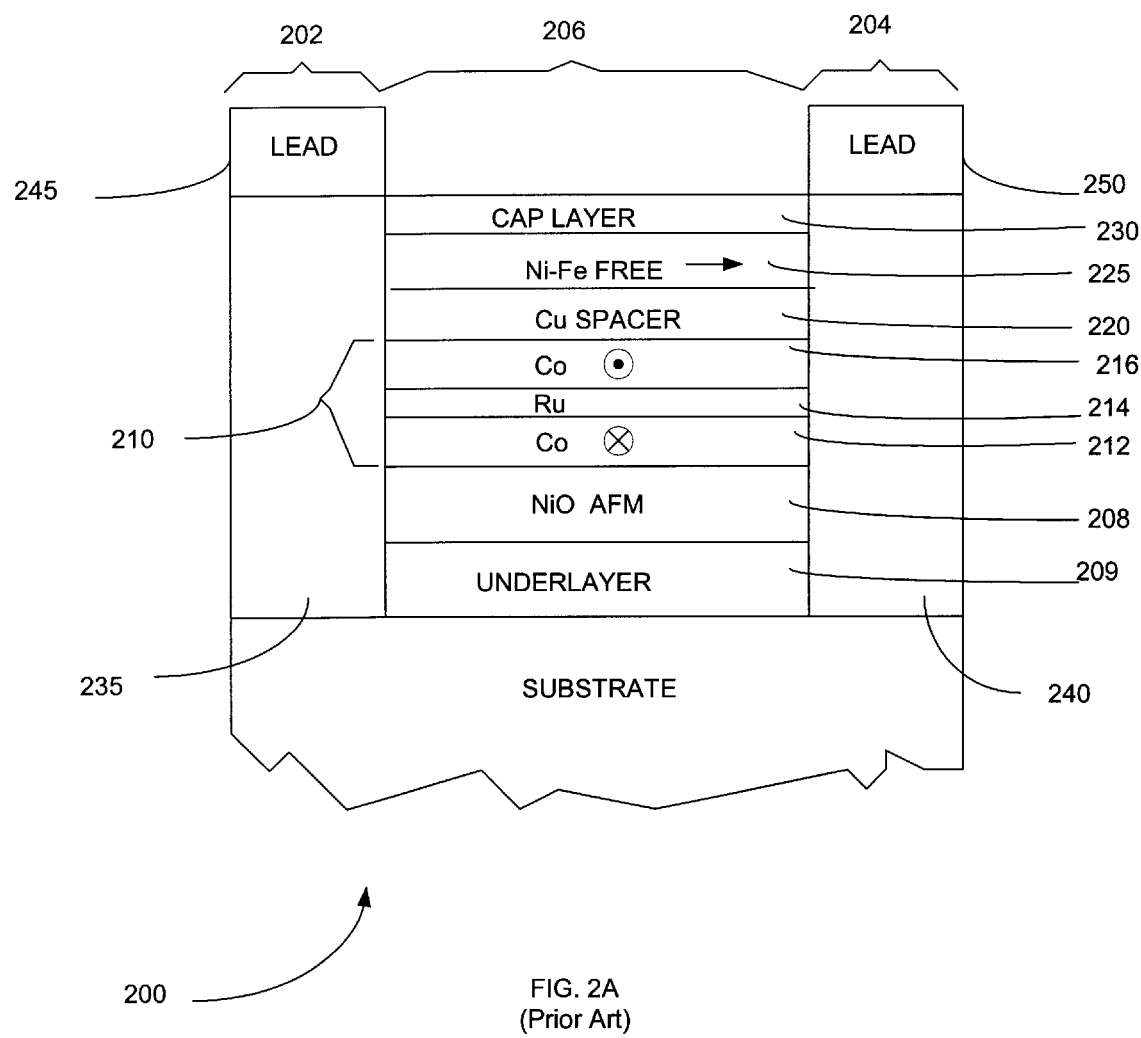
FIG. 2A illustrates a simplified cross-sectional view of the MR head showing the hard bias layer and the MR sensor thereof.
Figure 2B:
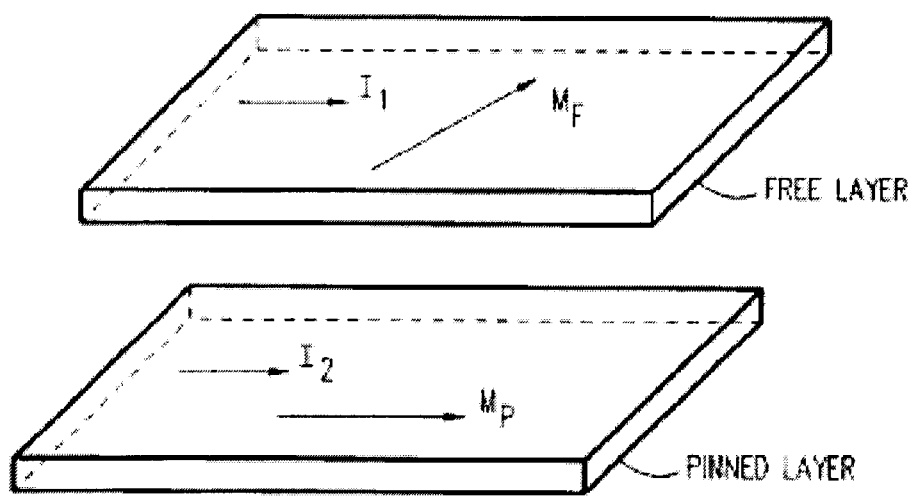
FIG. 2B illustrates the MR sensor and the placement of the domain wall of FIG. 2A.
Figure 2C:
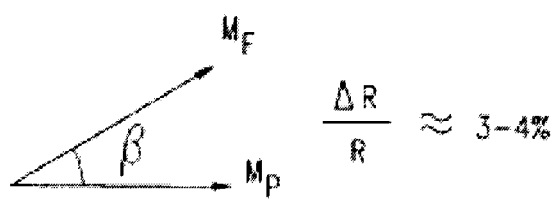
FIG. 2C illustrates the cosine of the angle β between the magnetization vector of the pinned layer ($M_P$) and the magnetization vector of the free layer ($M_F$) shown in FIG. 2B.
Figure 3:
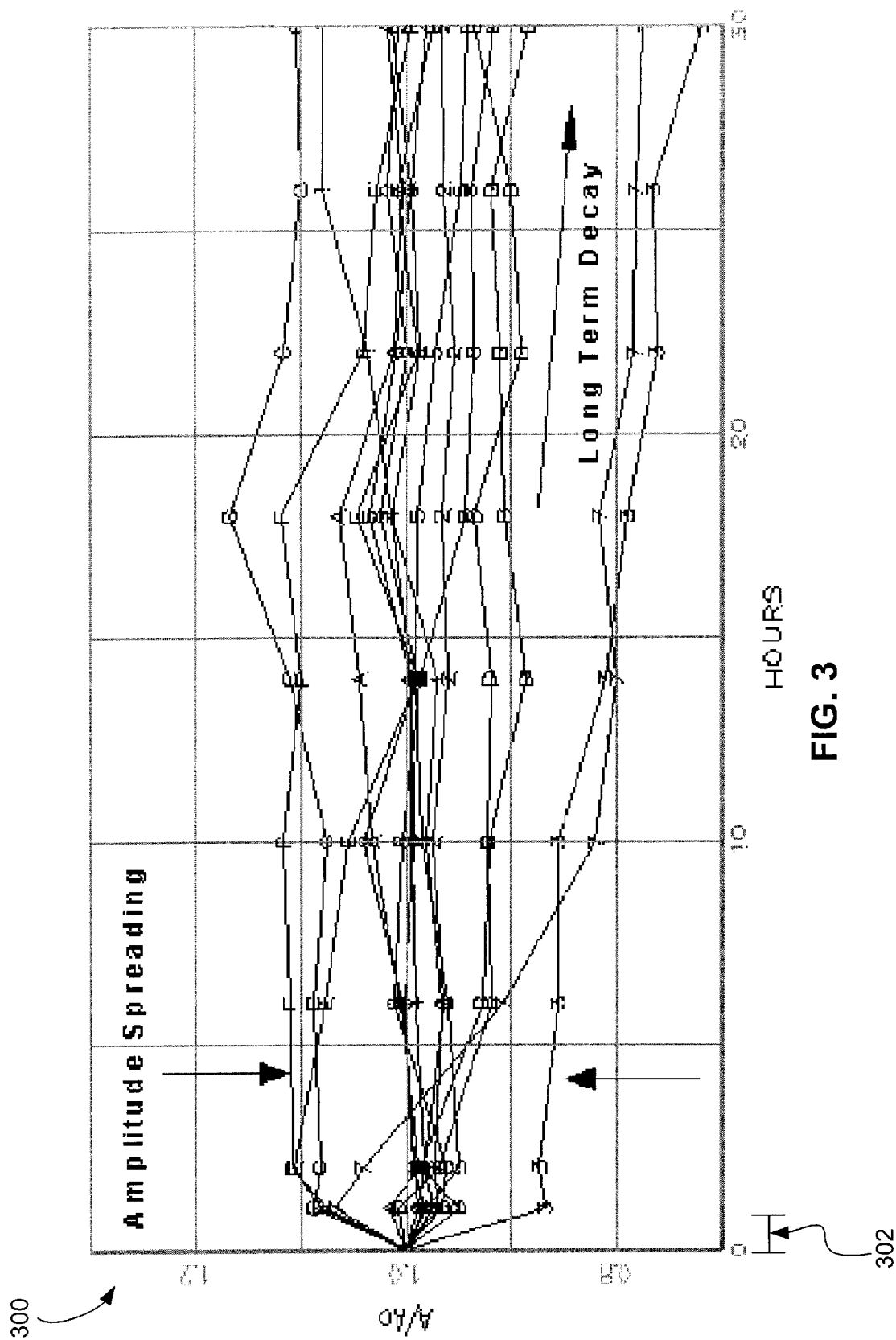
FIG. 3 is a chart depicting amplitude spreading of several heads.
Figure 6:
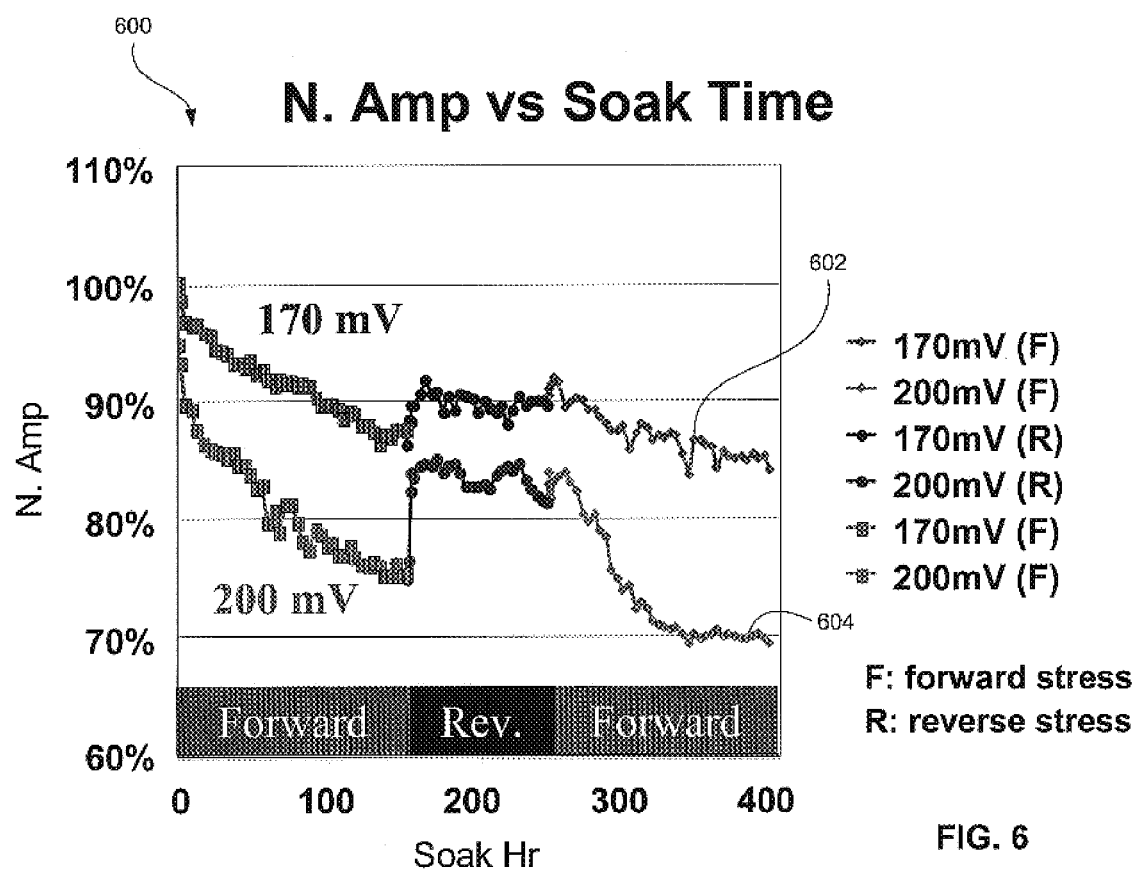
FIG. 6 illustrates a graph of normalized amplitudes of a current through read heads over several hundred hours.
Figure 7:
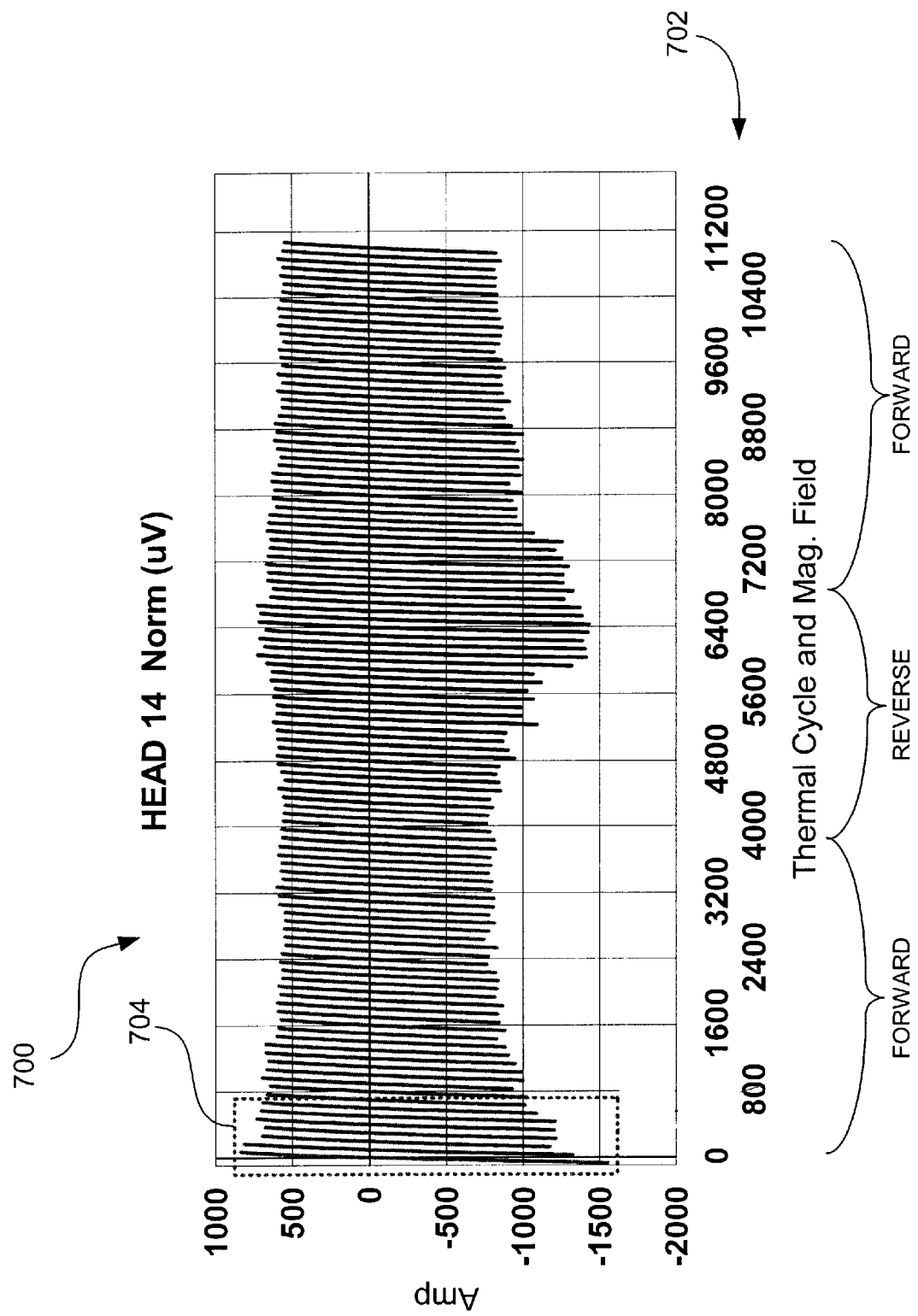
FIG. 7 shows a chart of the effect of the transfer curves (magnetic fields on the amplitude) during thermal cycles.
Figure 8:
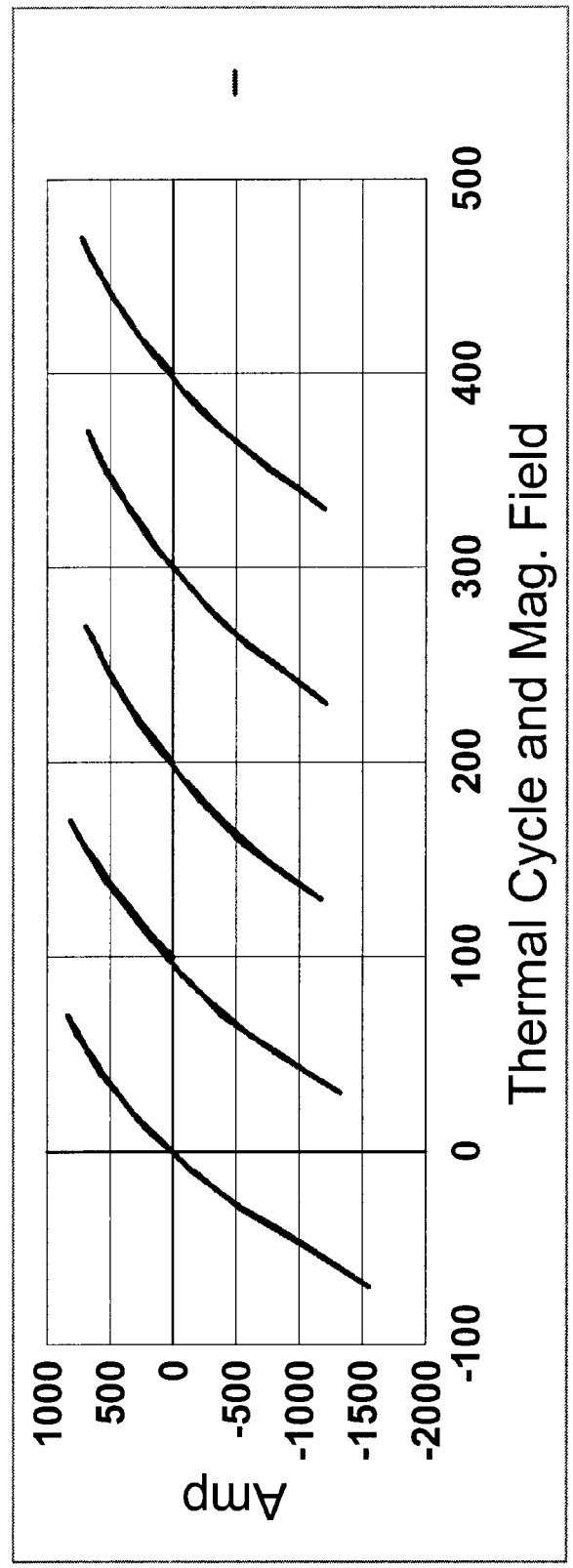
FIG. 8 is a detailed depiction of several curves of the chart shown in FIG. 7.

FIGS. 6–8 depict illustrative test results that can be used in the determination of stabilized head conditions. Data on amplitude spreading, such as shown in FIG. 3, can also be used.

FIG. 6 illustrates a graph 600 of normalized amplitudes of a current through read heads at an ambient temperature of about 65 degrees C., where the amplitude is a function of the total change of resistance times the current. This test can be performed to determine where the normalized amplitude, and thus the magnetic condition, will stabilize. Each curve is for an average of ten to fifteen heads. Curve 602 shows the degradation of the normalized amplitude through the heads at an operational bias voltage of 170 mV, where a forward-reverse-forward voltage is applied. Curve 604 shows the degradation of the normalized amplitude through the heads at 200 mV, where a forward-reverse-forward voltage is applied. As shown, the normalized amplitude is 100% at startup (time=0). However, the head does not approach stabilization until after 400 hours of voltage stress. Curve 602 stabilizes at about 85% normalized amplitude. Curve 604 stabilizes at about 70% normalized amplitude. Essentially, to set a sensor to its end state often requires hundreds of hours under the normal operational bias voltage.

Also seen in FIG. 6, the rate of going downward (forward polarity) or upward (reverse polarity) is highest when the voltage bias is first applied. The process of FIG. 5 sets the sensor to the end state or close to the end state by applying short duration of high voltage bias without damaging the sensor physically.

There are several issues associated with moving magnetization from the initial to the end states. One issue is that a head with good magnetic performance under the initial state may be considered a bad head under the end state. Also, the change in amplitude and other parameters may impact the final hard drive performance. By setting the sensor at or close to the end state, the quality of out-going heads is based on the head performance under the end state instead of the initial state.

With continued reference to FIG. 5, in operation 504, a heat threshold of the read head is determined. The heat threshold is preferably based on a point where the sensor is damaged due to thermal degradation. The heat threshold can be determined through experimentation, analysis of manufacturing specifications, etc.

Heat is used to accelerate stabilization of the head. An amount of heat for stabilizing a magnetization condition of the read head in a desired time frame is determined in operation 506. The determined amount of heat is preferably below the heat threshold calculated in operation 504 to avoid thermal damage to the head.

The heat rise created by passing a current through a sensor is proportional to the magnetoresistance of the sensor. The following equations describe a process for determining the heating on a sensor.

$$R_{hot}=R_{cold}(1+\alpha\Delta T) \quad \text{Equation 1}$$

where $R_{hot}$ is resistance measured at higher voltages (typically at 150 mV and above) relative to the voltage for measuring $R_{cold}$ (typically at 40 mV or below depends on the signal to noise ratio of the measurement tool). Higher bias voltage generates more Joule heating which raises the sensor temperature and, consequently, changes the resistance of the sensor. Alpha ($\alpha$) is the temperature coefficient of resistance for the read sensor. $\Delta T$ is the temperature rise due to the Joule heating.

The amount of heating is described in Equation 2.

$$H\Delta R=(R_{hot}-R_{cold})/R_{cold}=\alpha\Delta T \quad \text{Equation 2}$$

The correlation between HΔR and ΔT is clearly seen in Equation 2. Equation 2 can be easily measured and can be used to gauge the heating for each individual sensor when the threshold of voltage prestress is determined for the sensor.

The heating is very sensitive to the sensor dimension as described below:

$$\Delta T=\beta/(1-\alpha\beta) \quad \text{Equation 3}$$

where $\beta$ is calculated from Equation 4.

$$\beta=GV^2/MRW^2 \quad \text{Equation 4}$$

G is related to thermal impedance of the sensor, V is the voltage applied to the sensor, and MRW is the sensor physical width. Very often, $\alpha\beta$ is small relative to 1, so Equation 3 can be reduced to:

$$\Delta T=GV^2/MRW^2 \quad \text{Equation 5}$$

To maintain similar heating for various designs and products (i.e., various MRW and G), voltage can be adjusted accordingly as demonstrated in equation 5.

Sensor damage threshold is often described in energy:

$$\text{Energy}=(V^2/R_{hot})\times\text{duration} \quad \text{Equation 6}$$

The damage threshold can be predetermined from a separate measurement. As seen in equation 6, the shorter the duration, the higher the voltage bias that is allowed.

In operation 508, a width (duration) and amplitude of a voltage pulse that generates the determined amount of heat in the read head are calculated. The pulse width is very flexible in that it can be varied (>100 hours to <10 milliseconds) by adjusting the pulse amplitude. The amplitude of the voltage pulse can be calculated under a set pulse width for each sensor of the read head according to a Joule heating response of each sensor. The Joule heating response of a sensor is a function of a resistance of the sensor.

The width and amplitude of the pulse can be calculated experimentally by passing pulses of varying width and amplitude through a head and iterating through the results to obtain a pulse that provides the desired effect. The range of current used during such testing may depend on design, size of sensor, etc. because heat affects different head designs differently.

A voltage pulse of the calculated width and amplitude is applied to the read head in operation 510 for generating Joule heating in the read head. This Joule heating created by the pulse anneals the head and propels the magnetization conditions of the head towards its desired state. The width of the voltage pulse is preferably less than one second. A bias voltage can also be simultaneously applied to the read head when the voltage pulse is applied. The voltage pulse may need to be adjusted to account for the bias voltage.

Parts which reveal a significant change in magnetization can be identified and discarded. Magnetic parameters of the read head, such as amplitude, asymmetry, etc., are measured before and after sending the voltage pulse to the read head. The read head is failed if a difference between the magnetic parameters measured before and after the voltage pulse is sent is above a prespecified value (including outside a prespecified range).

Multiple pulses can be applied to the read head to assure the setting is adequate to the sensor. One or more voltage pulses are applied to the read head. Magnetic parameters of the read head, such as amplitude, asymmetry, etc., are measured before and after sending each additional voltage pulse to the read head. No more pulses are sent if (1) a difference between the magnetic parameters measured before and after a particular voltage pulse is below a prespecified value (including outside a prespecified range) or (2) the maximum allowed number of pulses is reached. Preferably, each pulse has the same polarity.

Magnetic relaxation due to the bias current is illustrated in FIG. 7. Transfer curves of a head in FIG. 6 are shown here. The transfer curve is: "bias current" times "change of resistance" as a function of magnetic field; where the change of resistance equals to ("$R_{hot}$ as a function of H" minus "$R_{hot}$ at H=0"); where H is the intensity of magnetic field. Each line in FIG. 7 represents a full transfer curve between +/−70 Oe; For the presentation purpose, each line is offset by 100 Oe between two thermal cycles. For example, the transfer curve at cycle 0 (or time 0) is plotted between −70 and _70 Oe in X axis, and that at cycle 1 is plotted between 30 and 170 Oe. Typically, there is a 4-hour elapsed time between two cycles. In FIG. 7, the head is biased with forward polarity, the head is operated from more curving portion of the transfer curve to more linear portion of the transfer curve. The movement results in a overall amplitude decrease. However, the reverse bias moves the operating point back to the more curving portion of the transfer curve. The relaxation is clearly demonstrated as reversible process.

FIG. 8 is a detailed depiction of the boxed area 704 of FIG. 7. Again, each curve is measured between +70 and −70 Gauss. The curves are plotted with an offset of 100 Gauss between thermal cycles. In this example, each thermal cycle lasts four hours.

The amplitude spreading effect shown in FIG. 3 is not evident in FIG. 6 because the data in this figure is the mean response of 10 or more heads. However, pre-stressing the heads removes or reduces the amplitude spreading, resulting in a more uniform distribution of heads. Because the tails of the head distribution have been reduced, which would be the first to fail, the heads can be run at higher bias voltage in the file, producing more amplitude and reduced error rates.

Thus, this relaxation can be accomplished in short times by using higher current or voltage than normal use, producing both increased temperature and magnetic fields.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An annealing process for setting a magnetization condition of a read head, comprising:
   determining an amount of heat for stabilizing a magnetization condition of a read head;
   calculating a width and amplitude of a voltage pulse for generating the determined amount of heat in the read head; and
   sending a voltage pulse of the calculated width and amplitude to the read head for generating Joule heating in the read head;
   wherein the width of the voltage pulse is less than one second.

2. The process as recited in claim 1, wherein the amplitude of the voltage pulse is calculated under a set pulse width for a sensor of the read head according to a Joule heating response of the sensor.

3. The process as recited in claim 2, wherein the Joule heating response of a sensor is a function of a resistance of the sensor.

4. The process as recited in claim 1, further comprising determining a heat threshold of the read head, the amount of heat determined for stabilizing the magnetization condition of the read head being below the heat threshold.

5. The process as recited in claim 1, wherein the amount of heat is calculated as a function of a magnetoresistive width of a sensor of the read head.

6. The process as recited in claim 1, further comprising simultaneously applying a bias voltage to the read head.

7. The process as recited in claim 1, further comprising measuring magnetic parameters of the read head before and after sending the voltage pulse to the read head, and failing the read head if a difference between the magnetic parameters measured before and after the voltage pulse is sent is above a prespecified value.

8. The process as recited in claim 1, further comprising:
   sending at least one additional voltage pulse to the read head;
   measuring magnetic parameters of the read head before and after sending each additional voltage pulse to the read head; and
   sending no more pulses if a difference between the magnetic parameters measured before and after a voltage pulse is below a prespecified value.

9. The process as recited in claim 1, further comprising adjusting an ambient temperature around the read head to a target temperature prior to sending the voltage pulse.

10. A system for setting a magnetization condition of a read head, comprising:
    an electrical coupling being coupled to a read head;
    logic for determining an amount of heat for stabilizing a magnetization condition of a read head;
    a processor for calculating a width and amplitude of a voltage pulse for generating the determined amount of heat in the read head; and
    a voltage controller for sending a voltage pulse of the calculated width and amplitude to the read head via the electrical coupling for generating Joule heating in the read head; wherein the width of the voltage pulse is less than one second.

11. The system as recited in claim 10, wherein the amplitude of the voltage pulse is calculated under a set pulse width for a sensor of the read head according to a Joule heating response of the sensor.

12. The system as recited in claim 10, wherein the Joule heating response of a sensor of the read head is a function of a resistance of the sensor.

13. The system as recited in claim 10, wherein the processor determines a heat threshold of the read head, the determined amount of heat being below the heat threshold.

14. The system as recited in claim 10, wherein the amount of heat is calculated as a function of a magnetoresistive width of a sensor of the read head.

15. The system as recited in claim 10, further comprising a bias voltage controller for simultaneously applying a bias voltage to the read head.

16. The system as recited in claim 10, further comprising a temperature manipulating device for adjusting an ambient temperature around the read head to a target temperature prior to sending the voltage pulse.

17. A computer program product for setting a magnetization condition of a read head, comprising:

computer code that determines an amount of heat for stabilizing a magnetization condition of a read head;

computer code that calculates a width and amplitude of a voltage pulse for generating the determined amount of heat in the read head; and computer code that sends a voltage pulse of the calculated width and amplitude to the read head for generating Joule heating in the read head;

wherein the width of the voltage pulse is less than one second.

18. A system for setting a magnetization condition of a read head, comprising:

a hard drive having a read head and an electrical coupling;

a voltage controller coupled to the hard drive for sending a voltage pulse of a calculated width and amplitude to the read head via the electrical coupling for generating Joule heating in the read head; wherein the width of the voltage pulse is less than one second.

19. The system as recited in claim 18, further comprising a temperature manipulating device for adjusting an ambient temperature inside of the hard drive.

* * * * *